Figure 1:
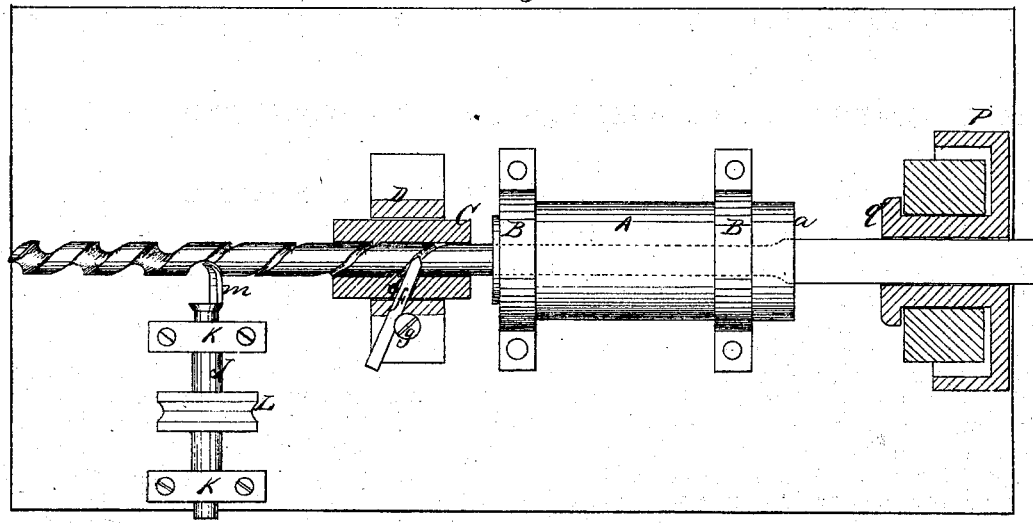
Figure 2:
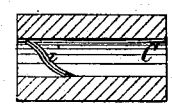
Figure 3:
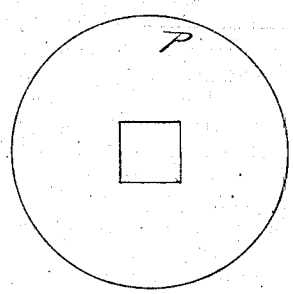

Edw.d A. Stockton. Machine for Spiral Mouldings.

No. 117477 — Patented Jul 25 1871

Witnesses.
Geo. H. Strong.
J. L. Boone.

Inventor.
Edw.d A. Stockton
by Dewey & Co.
his Attorneys

UNITED STATES PATENT OFFICE.

EDWARD A. STOCKTON, OF SAN FRANCISCO, CALIFORNIA.

IMPROVEMENT IN MACHINES FOR TURNING SPIRAL MOLDINGS.

Specification forming part of Letters Patent No. 117,477, dated July 25, 1871.

*To all whom it may concern:*

Be it known that I, EDWARD A. STOCKTON, of the city and county of San Francisco, State of California, have invented an Improved Machine for Turning Spiral Moldings; and I do hereby declare the following description and accompanying drawing are sufficient to enable any person skilled in the art or science to which it most nearly appertains to make and use my said invention or improvements without further invention or experiment.

The object of my invention is the construction of a machine or lathe with which spiral moldings can be turned by simply taking a square stick and running it through the machine, the entire work of grooving, rounding, and channeling being accomplished at the same time.

For a full illustration of my improved machine reference is had to the accompanying drawing, forming a part of this specification, in which A represents a horizontal barrel or hollow auger having the auger at the end $a$. This barrel or auger bears in boxes B at each end, which are supported in any convenient manner at the height it is desired to construct the machine. C is a small stationary nut or metallic barrel, which is fixed in a box, D, in such position that the bore shall be in a line with the bore of the barrel A. At one side of the box D is an opening, $e$, which passes through to the interior of the barrel C, and into which a gouge, $f$, is placed and held by a screw, $g$, or by other means, so that the point of the gouge will enter the bore of the barrel. The cutting-edge of this gouge is made V-shaped, so that as the rounded stick of wood passes through the barrel a V-shaped channel will be cut in it. A thread, $i$, commences at the opening $e$ on the inside of the barrel, and extends spirally to the outer end, so that as soon as the V-shaped channel is made by the gouge $f$ the turning of the stick will cause the thread to enter the channel and thus give to the stick a progressive motion. The pitch of this spiral thread will regulate the pitch of the spiral groove in the molding. A shaft, J, is supported in boxes K, at right angles to the line of the bore in the barrels, and a little in advance of the barrel C. A pulley, L, is fixed upon this shaft, around which a driving-belt passes in order to revolve the shaft.

In the end of this shaft is fixed a cutting-bit, $m$, which can be made of any desired pattern, in order to cut different styles of grooves. This bit is made curved in one direction only, so as to cut around in a circle from a fixed center. This gives the advantage of being able to cut the wood in the direction of the grain upon both sides of the channel, as it cuts down on one side and up on the other, or the reverse, according to the direction in which the bit is revolved, thus permitting a better finish to be given to the channel. As the stick of wood is fed through the barrel C by the thread $i$, the lateral bit $m$ will follow in the track of the V-shaped channel and finish up the molding in proper style, according to the pattern of the bit used. The square stick of wood is revolved by means of the following device: A wheel, P, having a suitable projecting hub or journal, $q$, is supported in boxes at the front end of the machine. A square hole is made through the center of the wheel and its hub or journal, which, when the wheel is in position, will be in a line with the bore of the hollow augers A. The hole is large enough to admit the square stick and allow it to readily pass through it, while it is caused to be carried around or revolved by the revolutions of the wheel. In starting the machine it will be necessary to push the stick through the bore of the revolving hollow auger until the thread $i$ engages with the V-groove, when the progressive motion given to it by the spiral thread will feed it forward to the cutting or trimming-bit.

By the use of this machine I am enabled to turn out highly-finished spiral moldings from the square stick by running it once through the machine, and that with but little trouble.

Having thus described my invention, what I claim as new, and desire to secure by Letters Patent, is—

The wheel P having its journal $q$ provided with a square hole, in combination with the hollow auger A, nut C, and gouge $f$, all constructed and operated substantially as and for the purpose set forth.

EDWARD A. STOCKTON. [L. S.]

Witnesses:
JNO. L. BOONE,
WM. H. RUNNELS.